(12) United States Patent
Claypool

(10) Patent No.: US 9,484,721 B2
(45) Date of Patent: Nov. 1, 2016

(54) TRUCK AND INSTALLATION METHOD FOR WIRES

(71) Applicant: Mass. Electric Construction Co., Omaha, NE (US)

(72) Inventor: James Claypool, Bellevue, NE (US)

(73) Assignee: MASS ELECTRIC CONSTRUCTION CO., Omaha, NE (US)

( * ) Notice: Subject to any disclaimer, the term of this patent is extended or adjusted under 35 U.S.C. 154(b) by 395 days.

(21) Appl. No.: 13/963,868

(22) Filed: Aug. 9, 2013

(65) Prior Publication Data

US 2015/0041739 A1 Feb. 12, 2015

(51) Int. Cl.
*H02G 1/04* (2006.01)
*B60M 1/28* (2006.01)

(52) U.S. Cl.
CPC . *H02G 1/04* (2013.01); *B60M 1/28* (2013.01)

(58) Field of Classification Search
None
See application file for complete search history.

(56) References Cited

U.S. PATENT DOCUMENTS

| 4,222,332 A * | 9/1980 | Newman | B60F 1/043 |
| | | | 105/72.2 |
| 4,456,093 A | 6/1984 | Finley et al. | |
| 5,048,797 A * | 9/1991 | Theurer | B60M 1/28 |
| | | | 254/134.3 R |
| 5,114,119 A | 5/1992 | Theurer et al. | |
| 5,161,312 A | 11/1992 | Theurer et al. | |
| 7,406,919 B2 | 8/2008 | Coots | |

FOREIGN PATENT DOCUMENTS

AU  2010100896  9/2010

OTHER PUBLICATIONS

Article; 'Optimised catenary maintenance measures on Austrian Federal Railways' to Rail Engineering International Edition 2002 No. 1, Jun. 6, 2002 entire document, especially fig. 7, p. 15-16 (6 pgs.).
PCT Invitation to Pay Additional Fees and, Where Applicable, Protest Fee of PCT/US14/46915; dated Oct. 31, 2014; (2 pgs.).
PCT International Search Report of PCT/US14/46915; dated Jan. 21, 2015; (4 pgs.).
PCT Written Opinion of the International Searching Authority of PCT/US14/46915; dated Jan. 21, 2015; (5 pgs.).

* cited by examiner

*Primary Examiner* — Joseph J Hail
*Assistant Examiner* — Brian Keller
(74) *Attorney, Agent, or Firm* — DLA Piper LLP (US); Timothy W. Lohse

(57) ABSTRACT

A truck and method for installing catenary wire are disclosed in which the truck may have wire manipulating arms, a creep drive and a wire measuring device. The wire manipulating arms may be used to hold the messaging wire and/or contact wire while the wire measuring device may be used to measure the height and stagger of the contact wire.

15 Claims, 20 Drawing Sheets

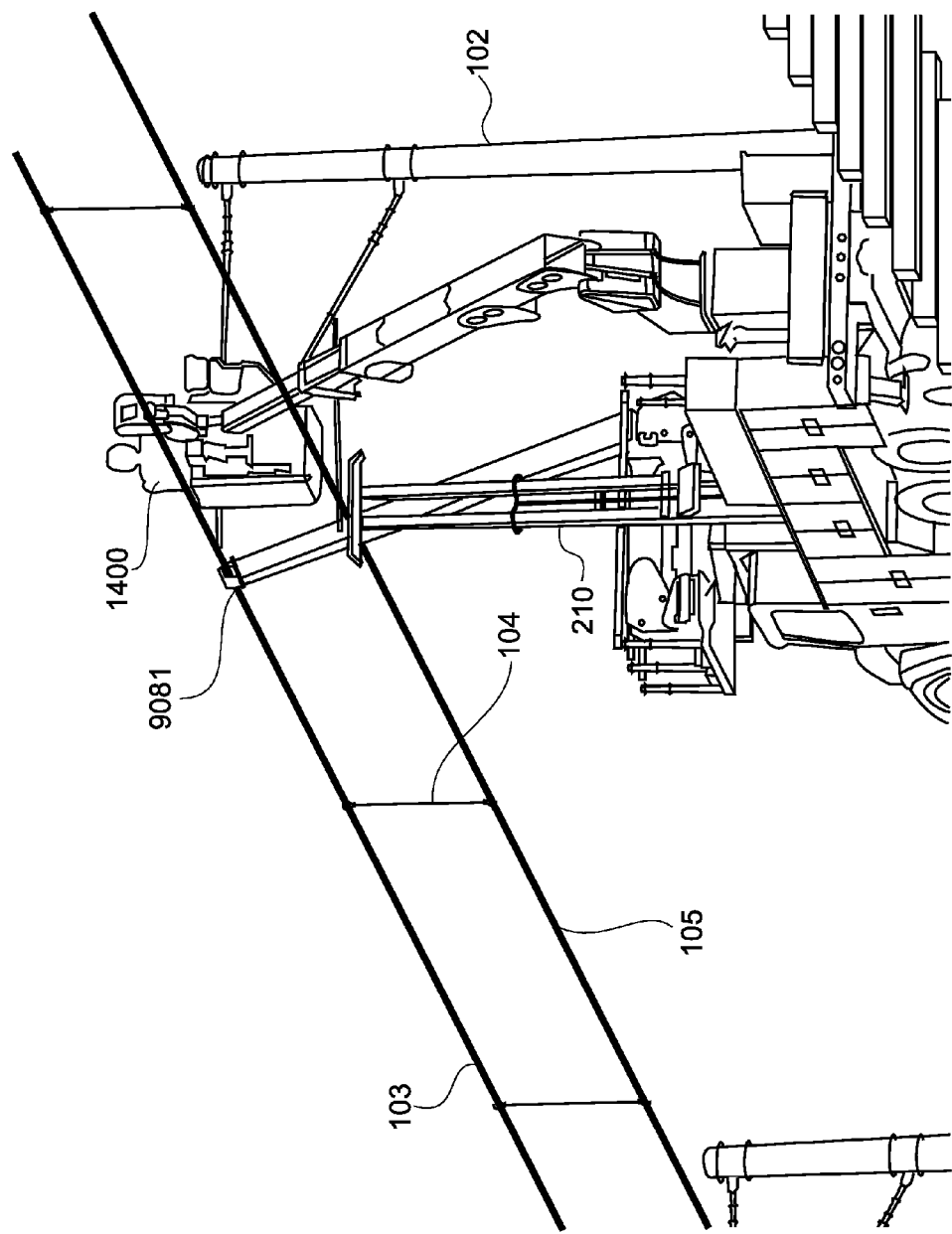

TRUCK AND INSTALLATION METHOD FOR WIRES

FIELD

The disclosure relates generally to a method for installing, maintaining and repairing wire and in particular to a truck and method for installing, maintaining and repairing catenary wire.

BACKGROUND

Catenary is used to provide a way to power an electricity powered transportation system. For example, FIG. 1 illustrates a typical catenary wire installation for an electricity powered train that runs on a set of tracks 101. The wire follows along the set of tracks and may be supported by one or more support posts 102 that are installed adjacent to the set of tracks 101 at periodic intervals. The one or more support posts 102 may each have a set of cantilever arms 106 that extend away from the support post, have insulators and hold the various wires described below. The wire may include a messenger wire 103 (that carries current and supports the contact wire) that is strung between the support posts 102, one or more dropper segments 104 that support a contact wire 105 that hangs down from the messenger wire 103 and is electrified so that an electric powered transportation system may contact the contact wire 105 that travels along the set to tracks 101 to power the transportation system.

In a typical system, a truck may have one or more rail gears that allow the truck to run along a set of tracks over which the catenary wire is to be installed. While the truck is running along the tracks, a person is typically still inside of the truck "driving" the truck. The typical truck has a platform on which a second person may stand to install the catenary wire while the truck is being driven by the person driving the truck.

In the typical truck, since the platform has to extend out away from the center of the truck to install the support posts and connect the catenary wires to the support post, the truck typically requires outriggers to maintain the stability of the truck during the installation process. In the typical systems, there is some mechanism to work with and perform the wire installation including the wire positioning, but that mechanism is difficult to work with. The wire installation may include holding the contact wire and catenary wire while working on the cantilever arms and/or the insulators that insulate the electrified contact wire from the support posts.

Once the wires are installed, it is necessary to measure the height and stagger of the contact wire above the top of rail. In typical systems, this may be done from the truck over the cab or using a trailer pulled behind the truck.

BRIEF DESCRIPTION OF THE DRAWINGS

FIGS. 14-17 illustrate a method for installing catenary wire using a catenary wire installation truck.

DETAILED DESCRIPTION OF ONE OR MORE EMBODIMENTS

The disclosure is particularly applicable to catenary wire installation truck for installing catenary wire adjacent to a set of tracks and it is in this context that the disclosure will be described. It will be appreciated, however, that the truck may also be used to install different types of wire and may be used to install wire that is not adjacent to a set of tracks.

Figure 1:
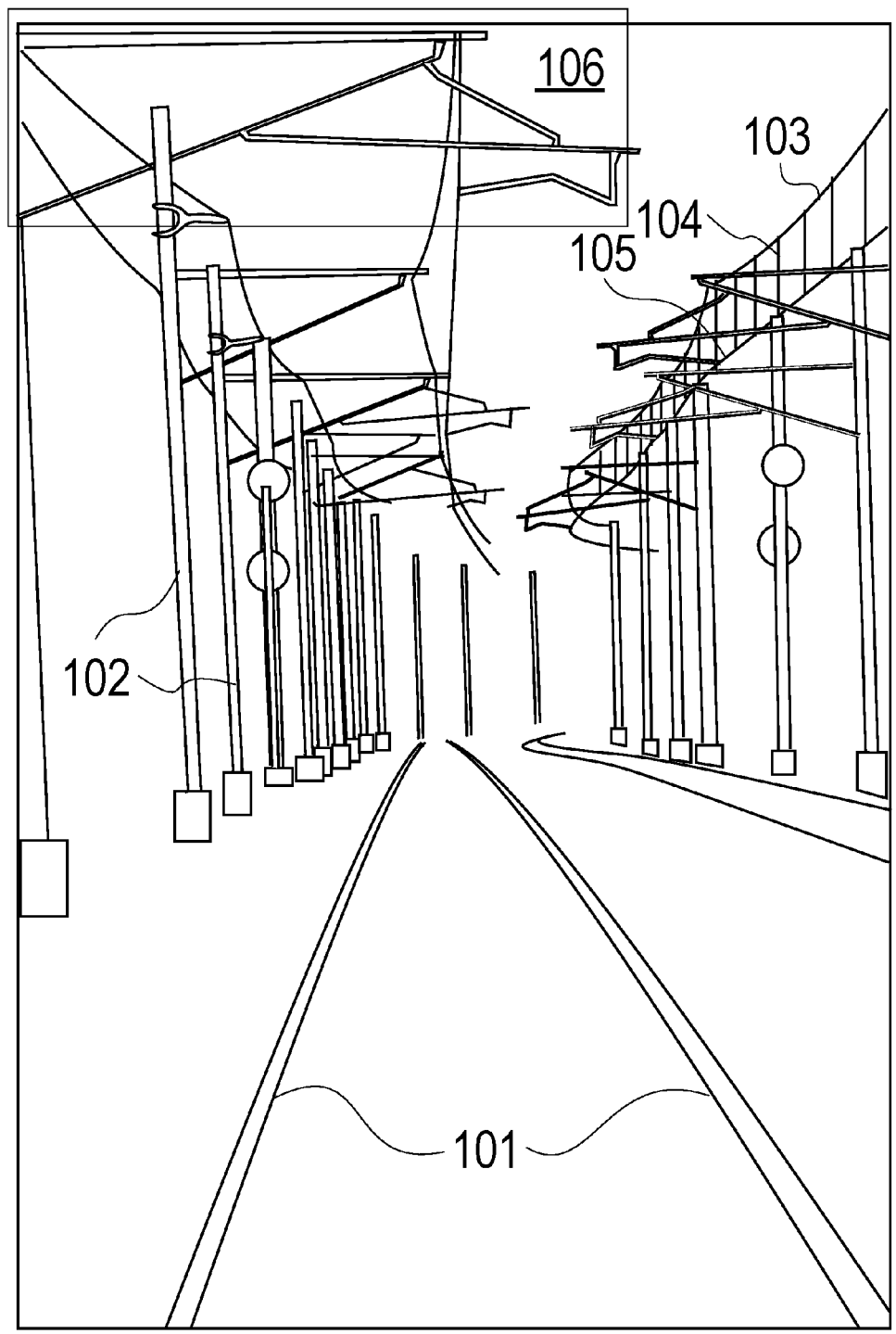
FIG. 1 illustrates a typical catenary wire installation for an electricity powered train.
Figure 2:
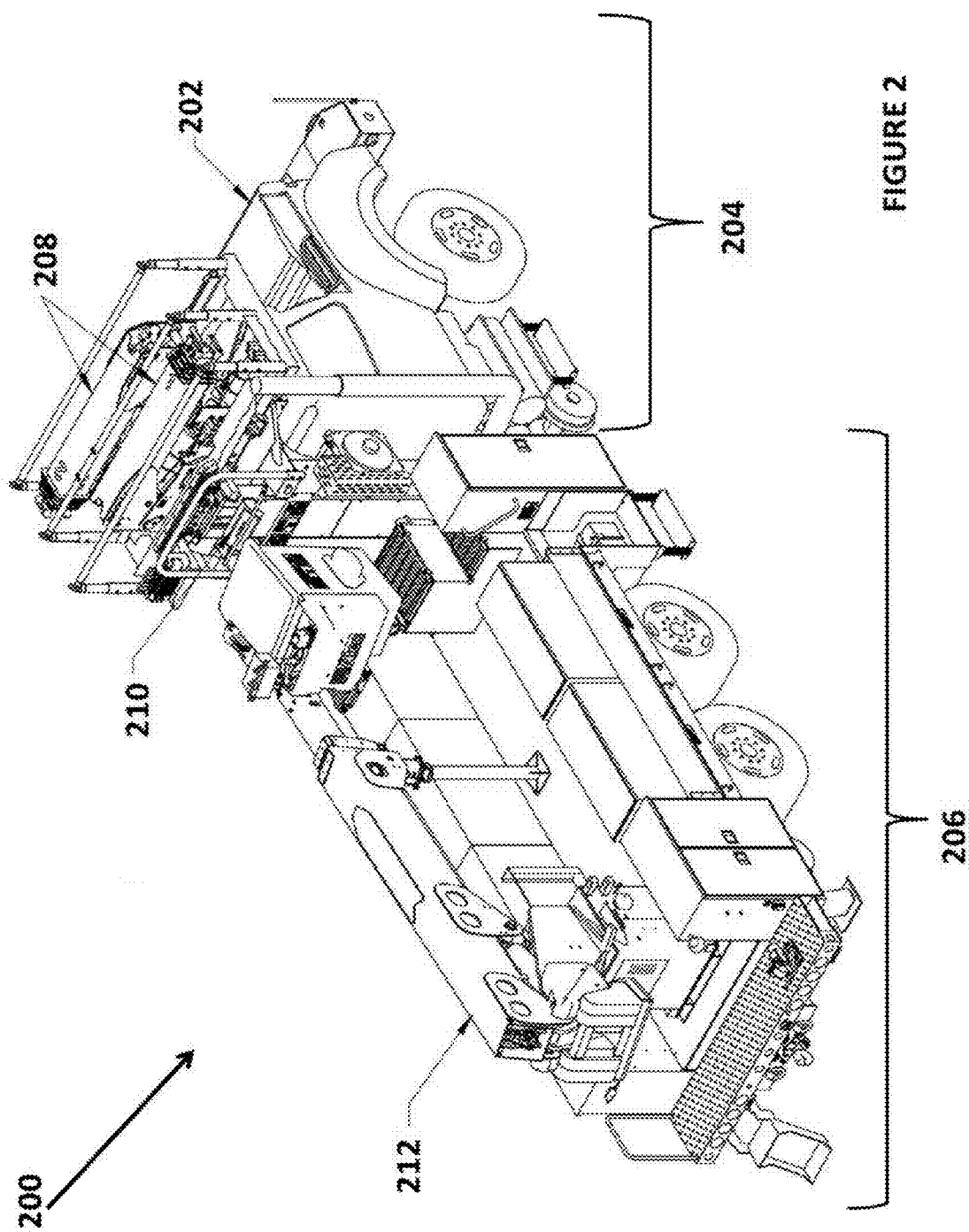
FIG. 2 is a perspective view of a catenary wire installation truck.
Figure 3:
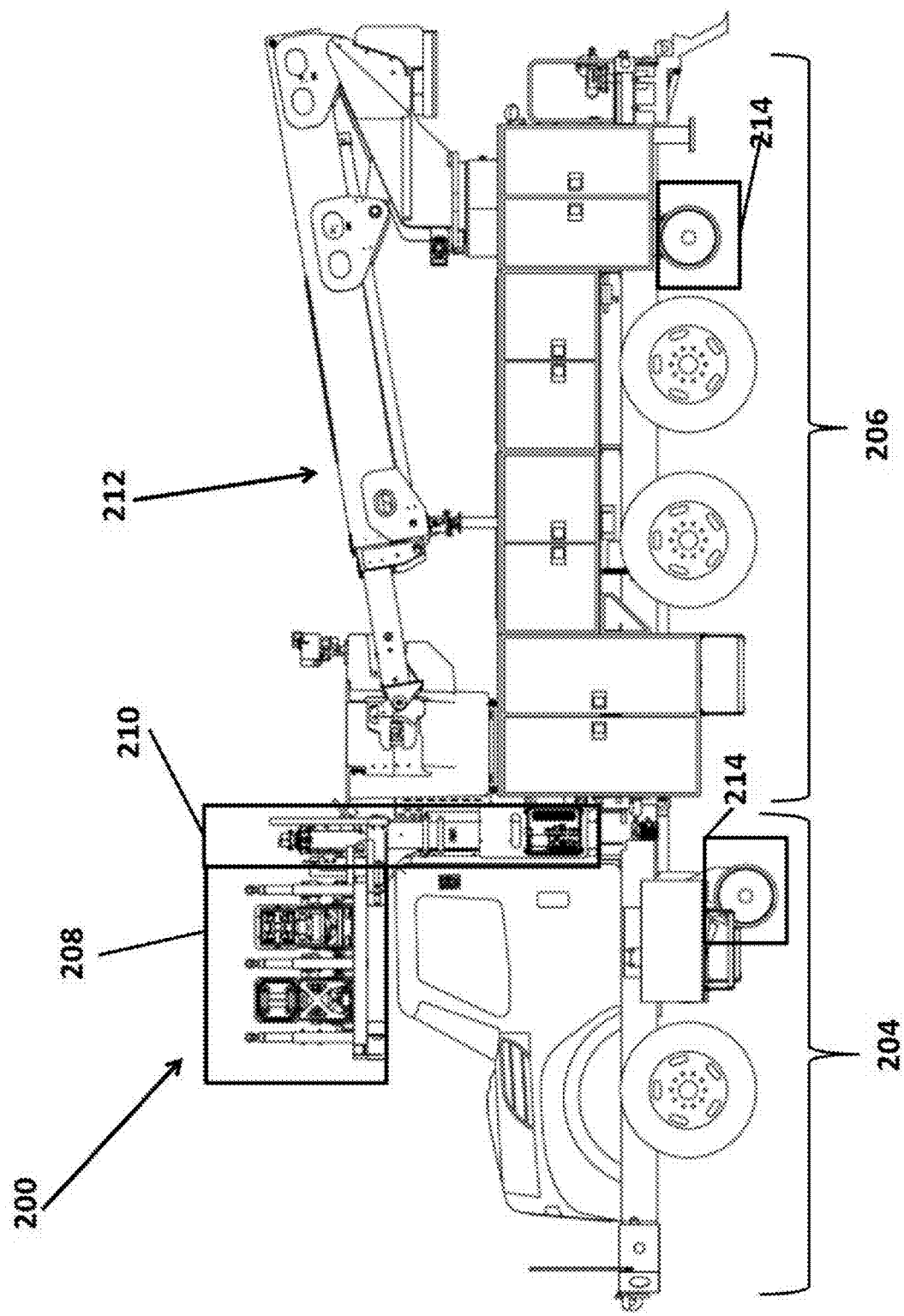
FIGS. 3 and 4 are a left side view and a right side view, respectively, of the catenary wire installation truck.
Figure 4:
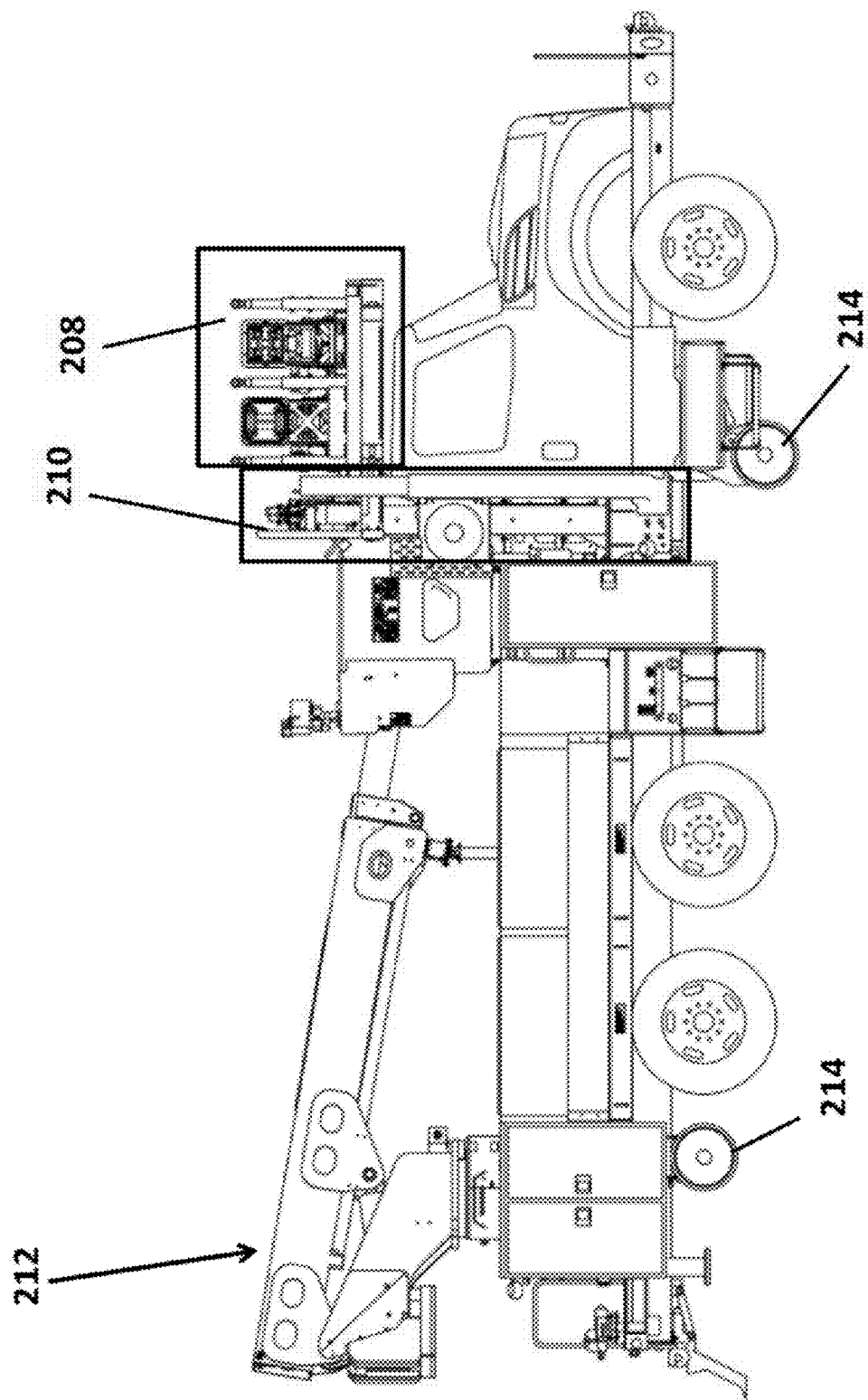
Figure 5:
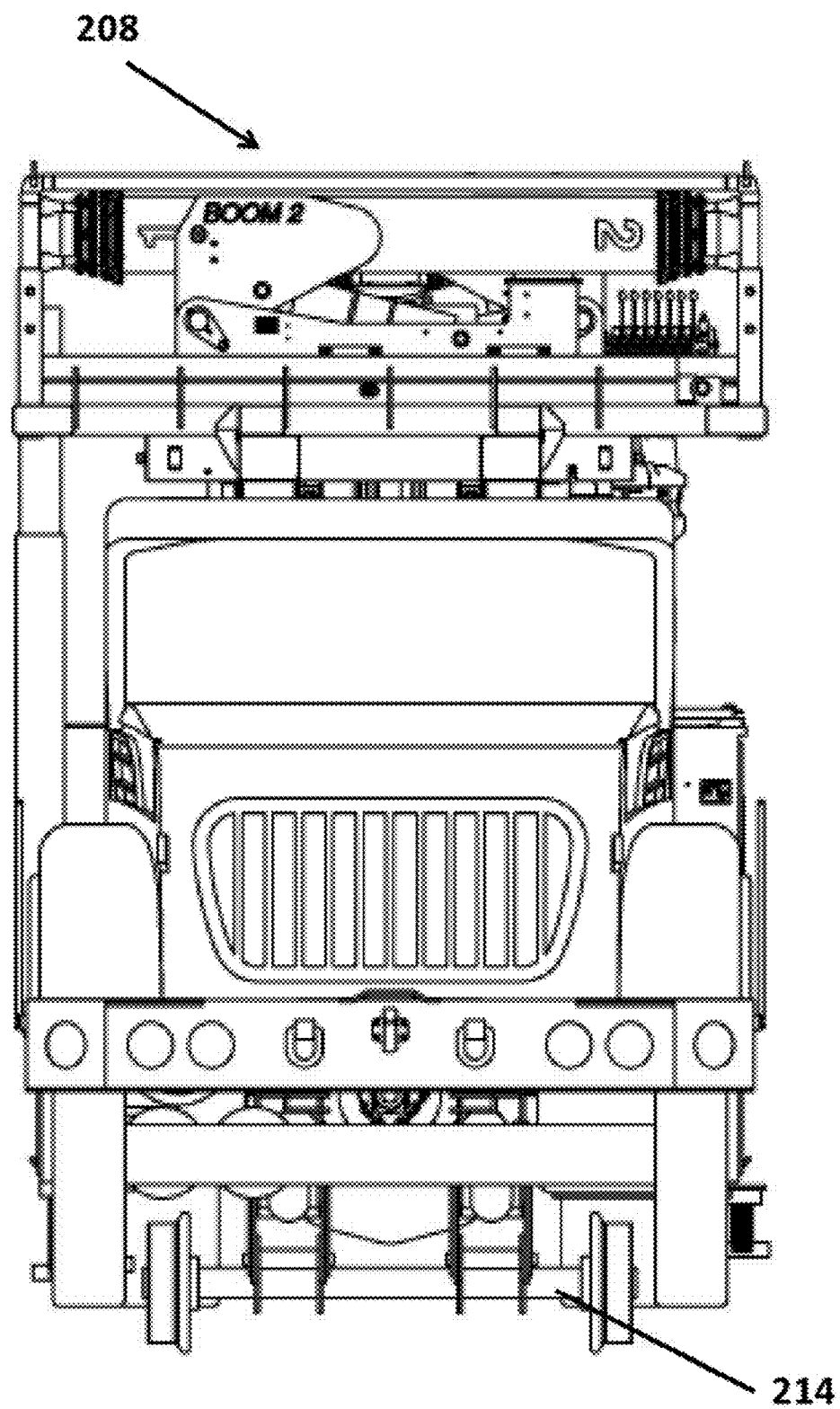
FIG. 5 is a front view of the catenary wire installation truck.
Figure 6:
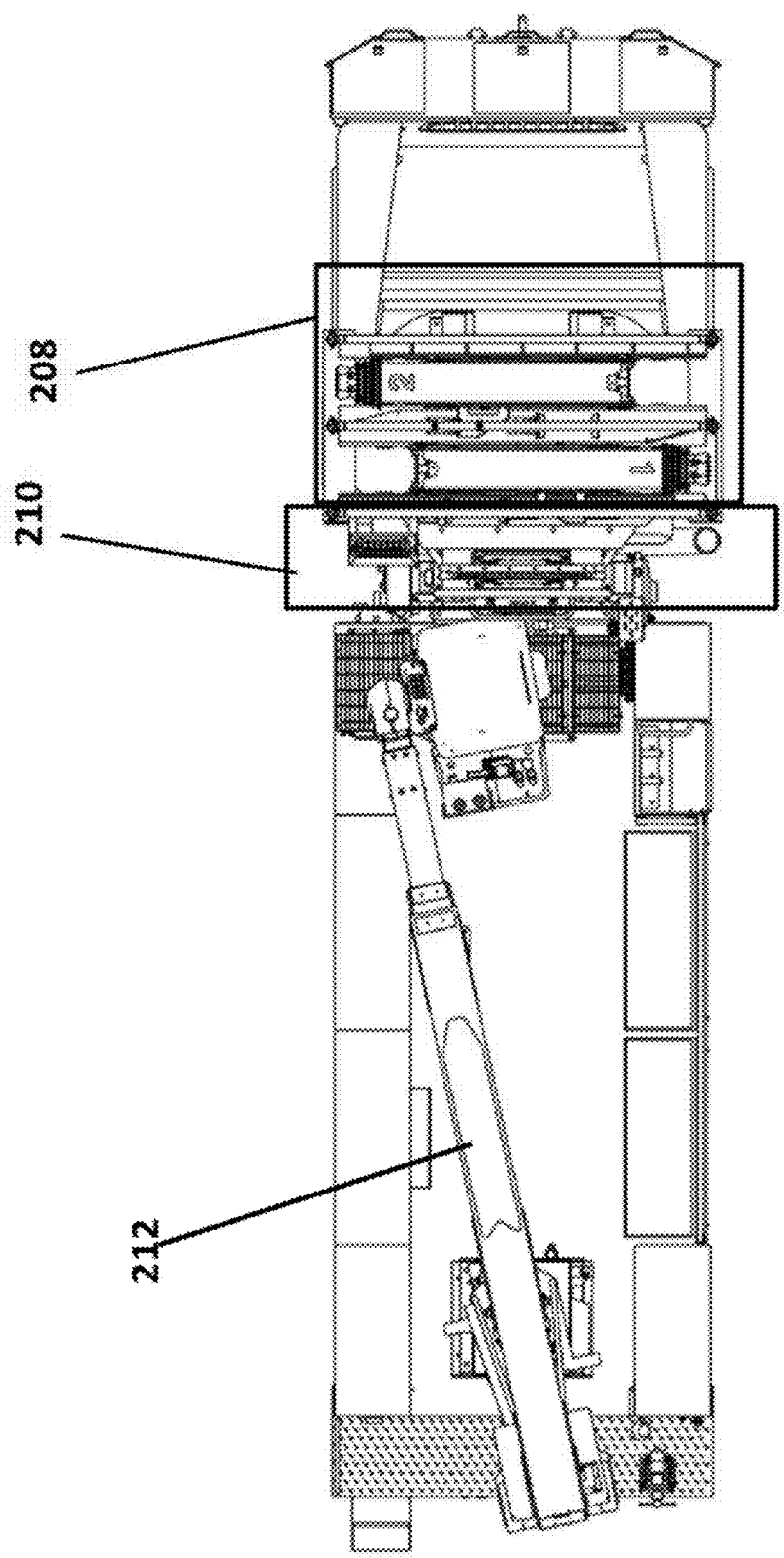
FIGS. 6 and 7 are a top view and a bottom view, respectively, of the catenary wire installation truck.

FIGS. 2-7 are different views of a catenary wire installation truck 200 that may be built based on a typical bucket truck 202, such as a Navistar brand truck, that may have a cab portion 204 and a bucket portion 206 as shown. The catenary wire installation truck 200 may also have a wire manipulator 208, such as the two wire manipulators shown in the embodiment in FIG. 2, a contact wire measuring device 210 and an aerial device 212. The one or more wire manipulators 208 may be mounted above the roof of the cab portion (shown in FIGS. 2-6), such as on a platform and may be used to hold either or both of the catenary wire or contact wire as shown in FIG. 1 and as described in more detail with reference to FIG. 9. The contact wire measuring device 210 may be mounted in a forward portion of the bucket portion just behind the one or more wire manipulators 208 and may be used to test a height and a stagger of the contact wire above the top of rail. The stagger may be a distance of the contact wire away from the center of the set of tracks. Typically, the stagger is not much more than 12 inches each side of centerline of the set of tracks. The height of the contact wire from top of rail varies a lot, even in the same single wire run. For example, when the rail goes under a low bridge the wire height will drop lower, if freight trains run on the same line the wire will be higher. Thus, for example, a contact wire height may be as low as 13 ft. from top of rail and as high as 26 ft. 6 inches from top of rail. The contact wire measuring device 210 is described in more detail below with reference to FIGS. 10-11.

Figure 7:
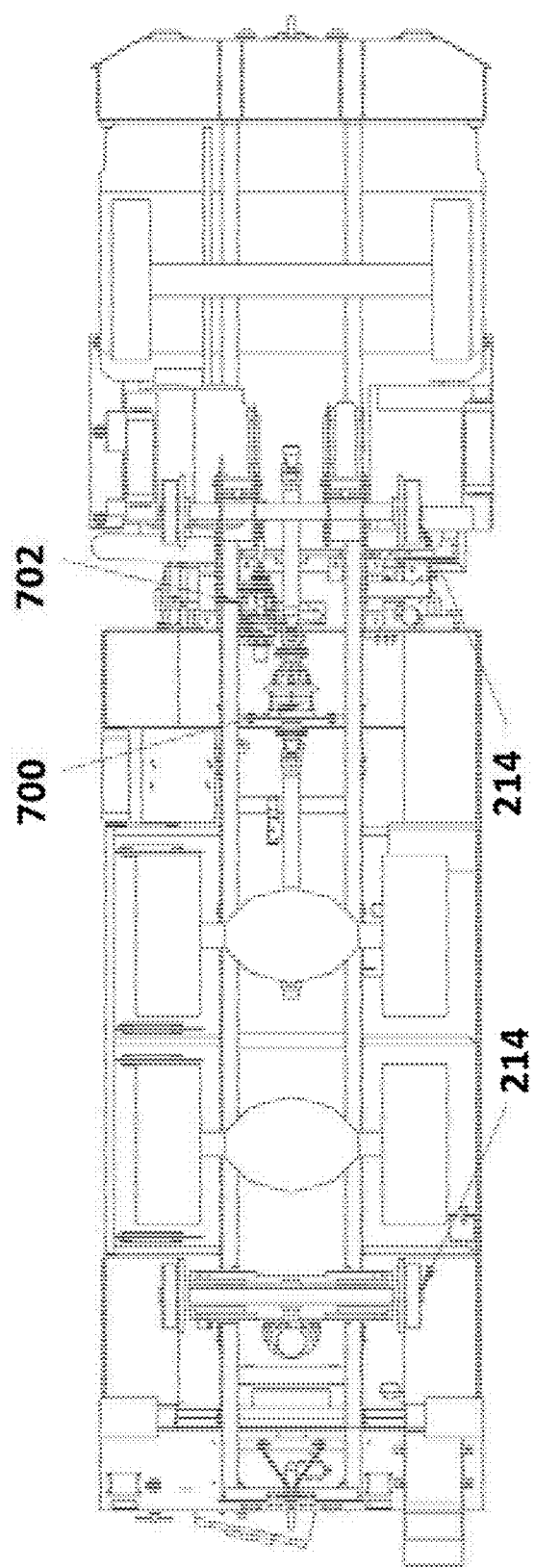

The aerial device 212 may be located towards the rear of the bucket portion of the truck and may allow an operator to assist with the wire installation process and method (and operate the wire manipulators 208) as shown in more detail in FIGS. 14-17. The aerial device 212 may have an arm portion and a bucket located at the end of the arm into which a user may stand and then lift the user above the ground. The aerial device 212 may be hydraulically actuated and may be a typical system that is not described in more detail herein. The catenary wire installation truck 200 may also have two sets of rail gears 214 (shown specifically in FIG. 3) that are attached to the underbody of the truck (as shown in FIG. 7) adjacent a front set of wheels and a back set of wheels, respectively, of the truck. Each rail gear 214 moves from a stored position in which the wheels of the rail gear do not contact a set of tracks and the truck may be driven on a road to an engaged position in which the wheels of the rail gear contact a set of tracks (and lift the wheels of the truck up so that the truck wheels do not contact the road) so that the truck may be moved along the set of tracks such as in shown in FIG. 13.

Figure 12:
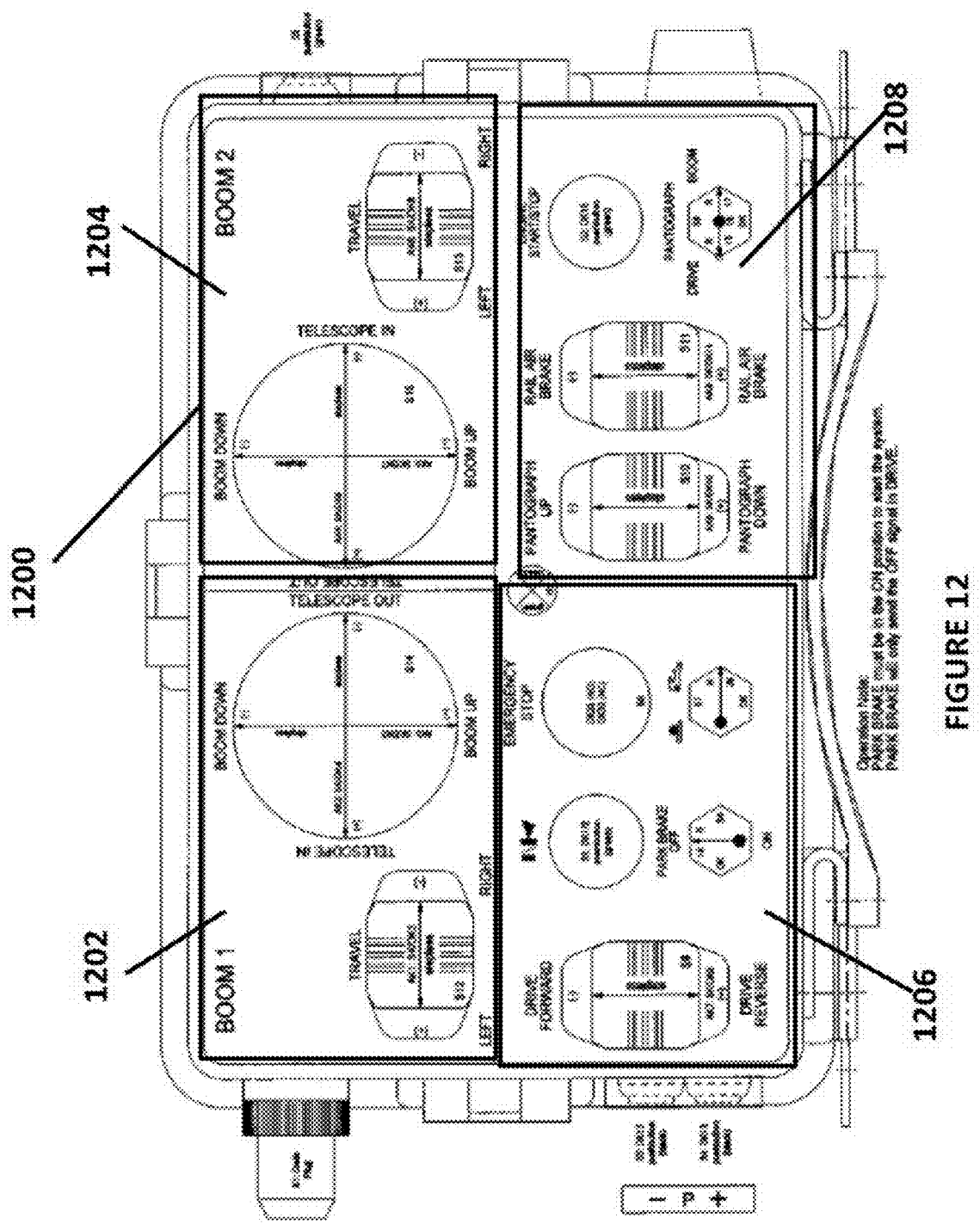
FIG. 12 illustrates a remote control device for moving the catenary wire installation truck along the set of tracks.

As shown in FIG. 7 (the bottom view of the truck 200), the installation truck 200 may also have a creep drive motor 700 and a creep drive pump 702 (collectively, a "creep drive system") mounted underneath the truck. The creep drive system allows the truck, once it is on the set of tracks to be moved along the set of tracks without a driver in the cab of the truck because the movement of the truck is done using the creep drive system and a control unit (an example of which is shown in FIG. 12.) When the creep drive system is engaged and moving the truck along the set of tracks, the engine of the truck may be placed into neutral. The creep drive system may be a hydraulic system that may use the creep drive pump 702 to pressurize the hydraulic system and pump the hydraulic fluid that operates the system. For example, the creep drive system may be a commercially available Addidrive creep drive system manufactured and sold by Poclain Hydraulics. It is known how to install such as creep drive system in a truck. The creep drive system may be used to allow a user to be in a bucket of the aerial 212 installing the wire (as described below in more detail) and then control the movement of the truck along the set of tracks using the creep drive system and the control unit that is connected to the creep drive system but may be located on the bucket of the aerial so that the control unit may be operated by the person in the bucket.

Figure 8A:
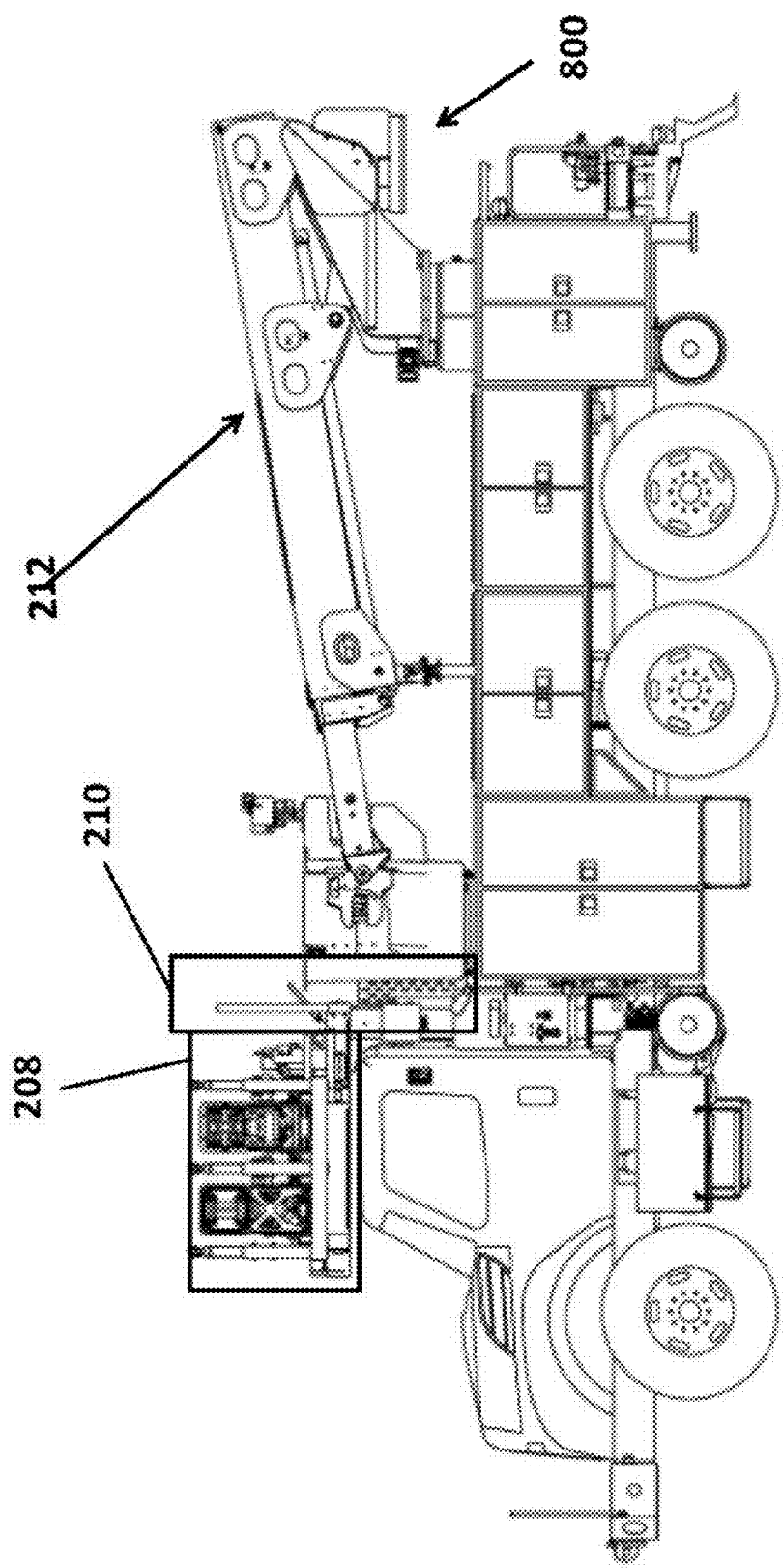
FIGS. 8A and 8B are two different views of a counterweight on the aerial of the catenary wire installation truck.
Figure 8B:
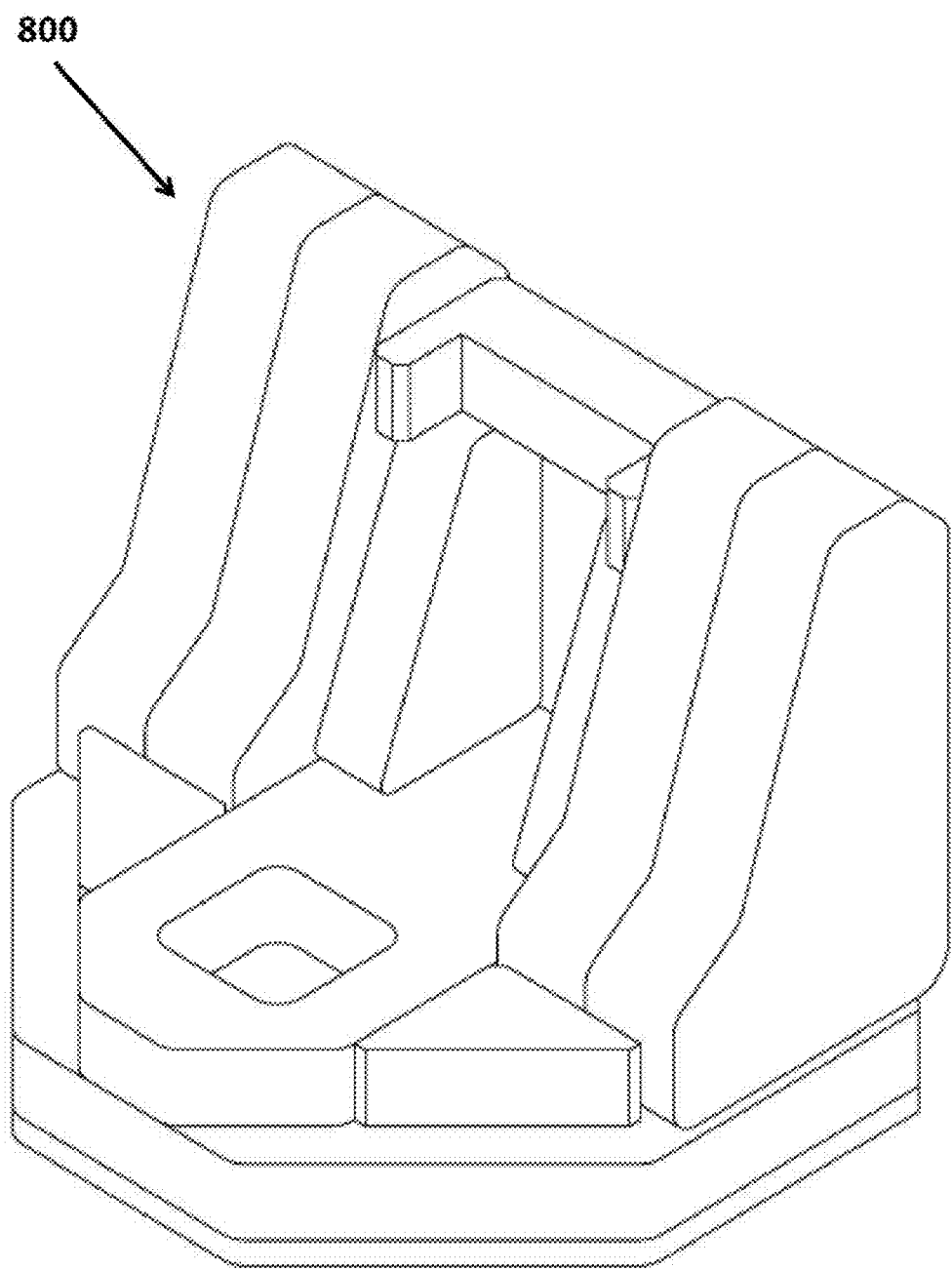

FIGS. 8A and 8B are two different views of a counterweight on the aerial 212 of the catenary wire installation truck. Specifically, the aerial 212 has a counterweight 800 so that the truck does not need to use typical outriggers for stability of the bucket when it is extended. The aerial with the counterweight provided stability, in tests, up to 6 degrees of side slope. The counterweight is shown in more detail in FIG. 8B. In the truck, the counterweight is positioned on an opposite side of a center of rotation so that when the bucket (and its load) is moved to the left, the counterweight is on the right side of the truck.

Figure 9A:
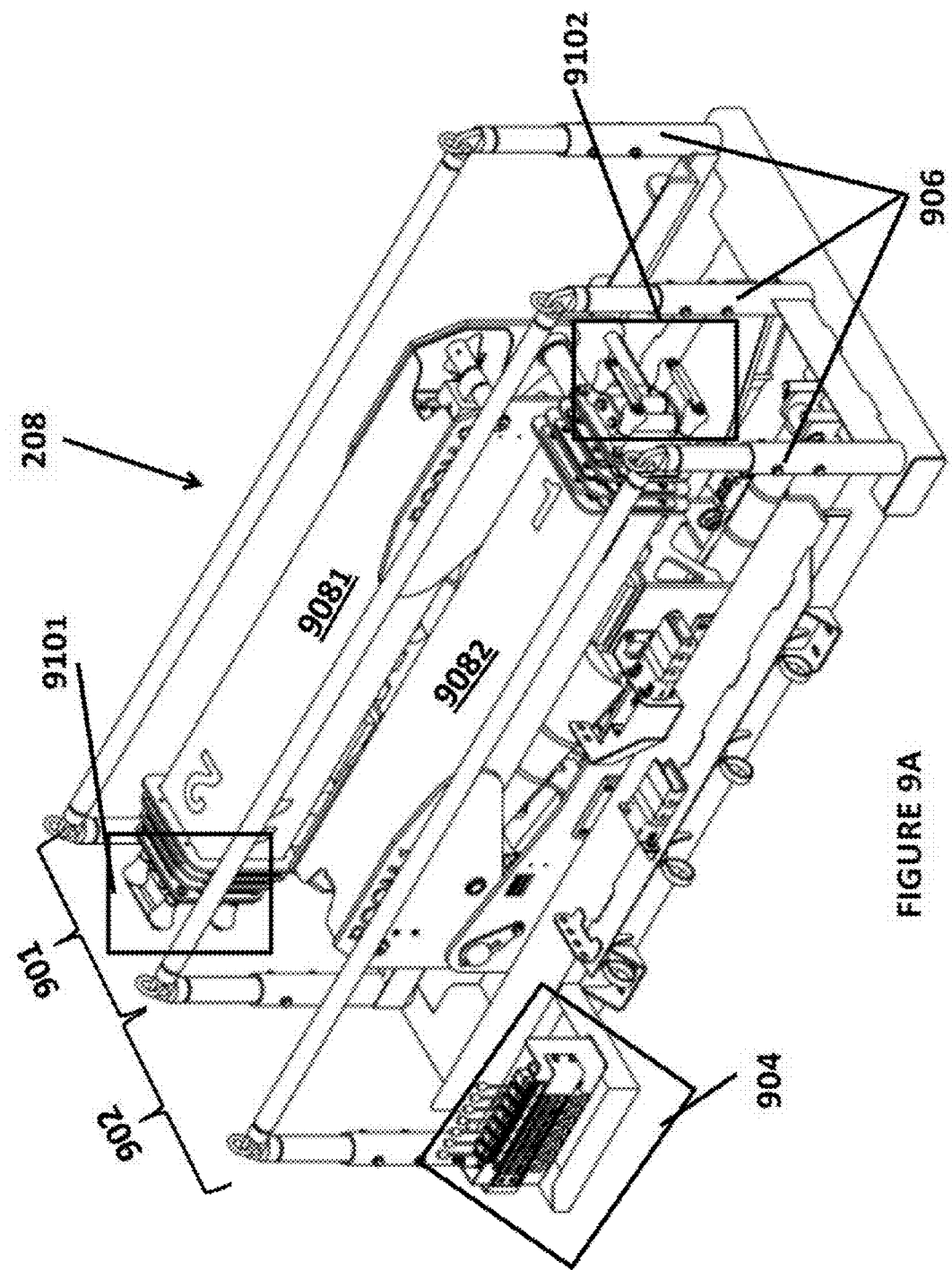
FIGS. 9A-9C illustrate more details of the wire manipulators that are part of the catenary wire installation truck.
Figure 14:
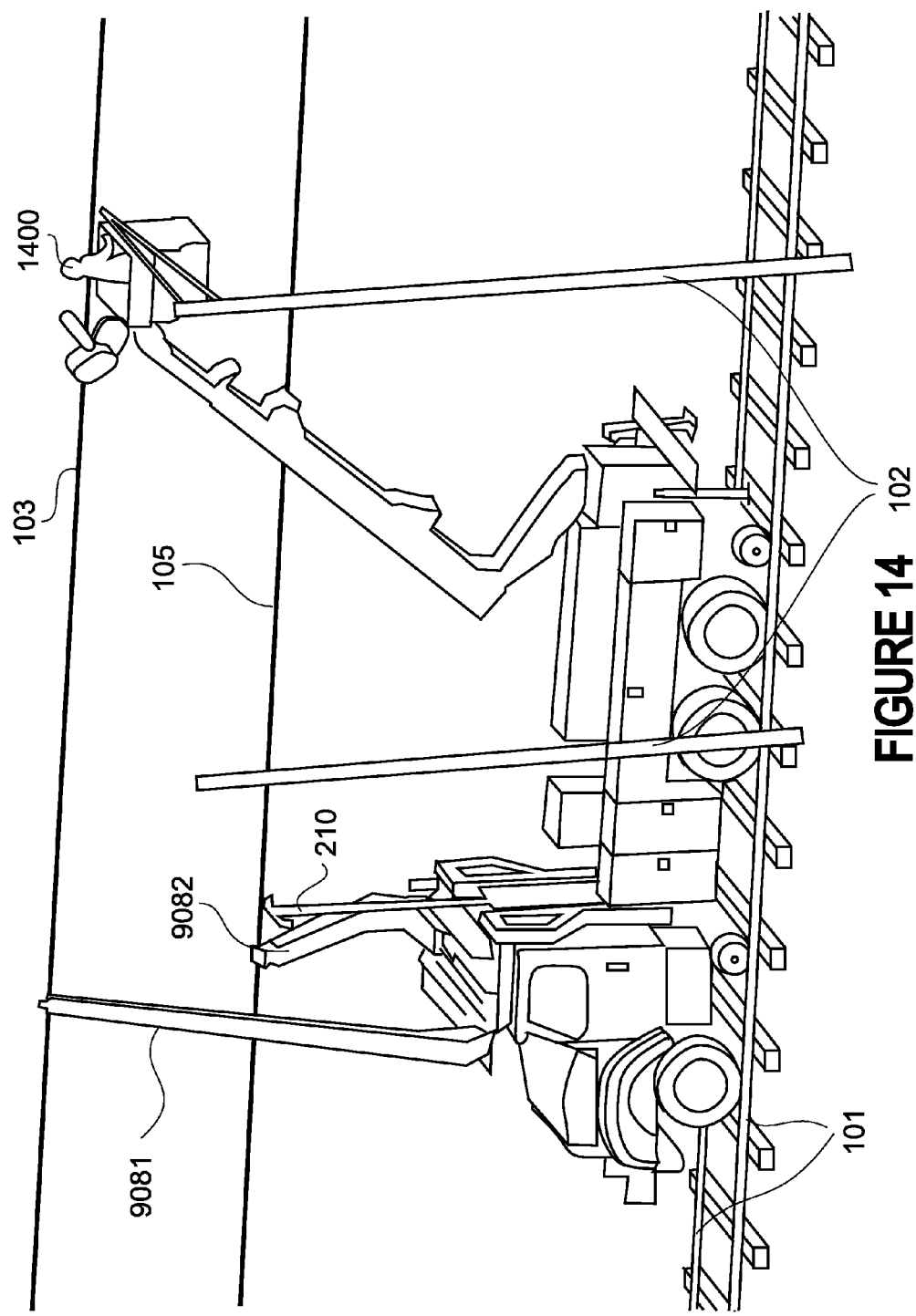
Figure 15:
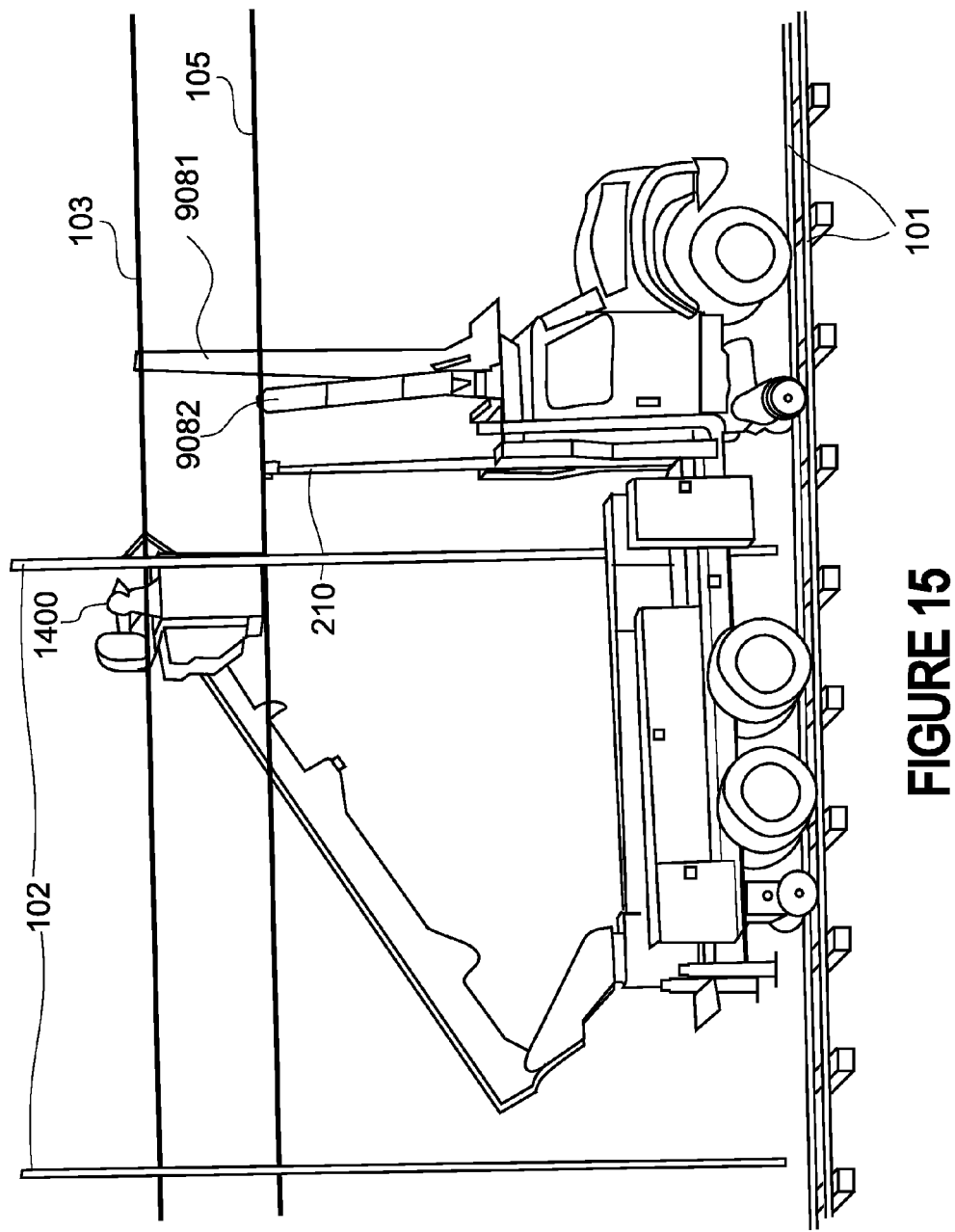
Figure 16:
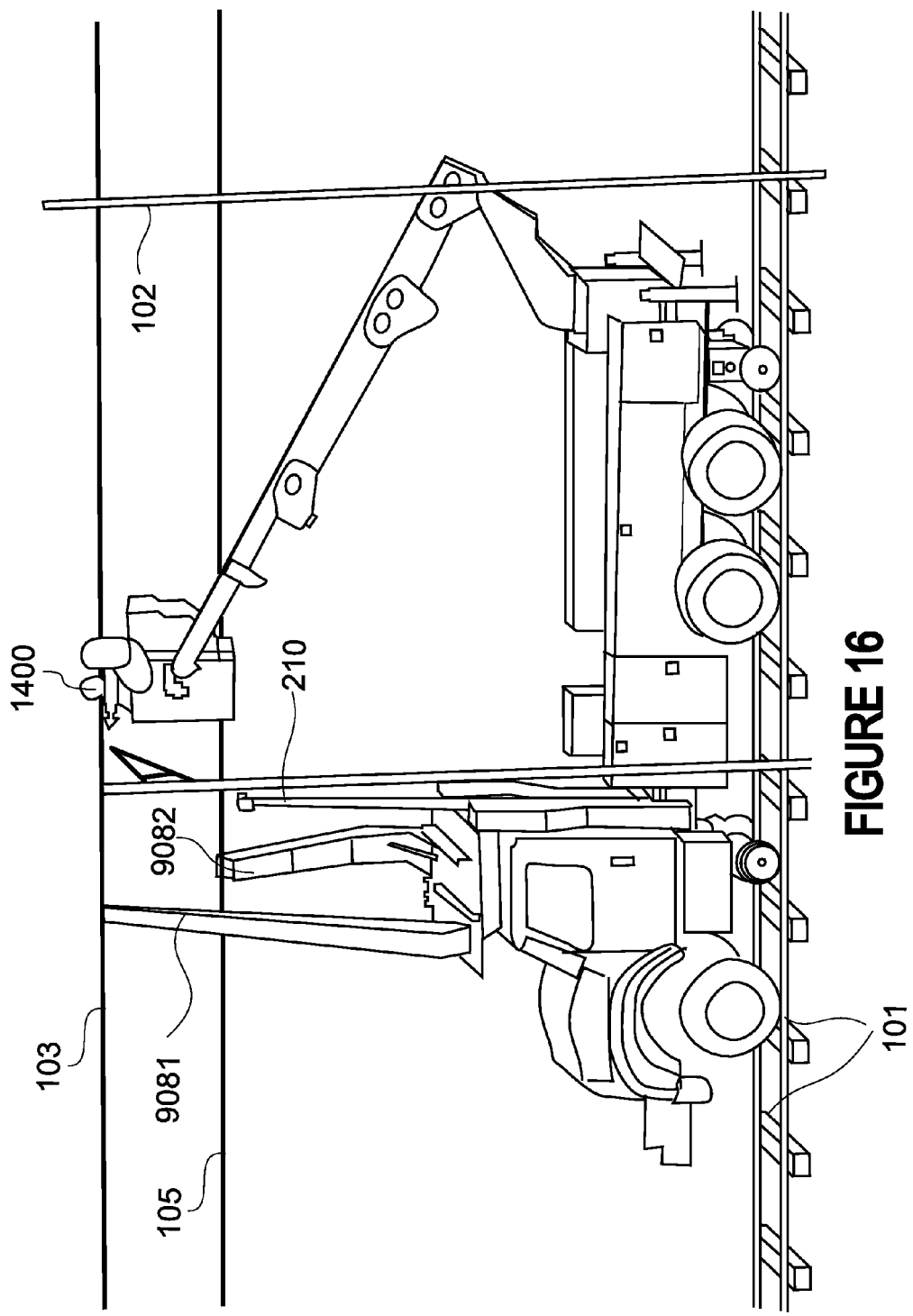

FIG. 9A illustrates more details of the wire manipulator 208 that are part of the catenary wire installation truck. The wire manipulator 208, in one embodiment, may have a first wire manipulator assembly 901 and a second wire manipulator assembly 902 that may be side by side as shown in FIG. 9A. The wire manipulator 208 also may have a set of controls 904 that allow a user to position each manipulator assembly and operate an end portion of each manipulator assembly to grab or release a wire. As described below, the control unit shown in FIG. 12 may also be used to control the wire manipulator 208. The wire manipulator 208 also may have one or more posts 906 at each end that are adjustable. Each wire manipulator assembly 901, 902 also may have a wire manipulator arm $908_1$, $908_2$, respectively, that may be hydraulically operated and may have a retracted position as shown in FIG. 9A and an extended position as shown in FIGS. 14-17. Each wire manipulator arm $908_1$, $908_2$ may be independently controlled and positioned so that, example, one wire manipulator arm $908_1$ may be extended to hold the messenger wire 103 and the other wire manipulator arm $908_2$ may be extended to hold the contact wire 105 as shown in FIG. 14. Each wire manipulator arm $908_1$, $908_2$ may also have an wire trapping mechanism $910_1$, $910_2$, respectively, that is used by each wire manipulator arm to trap a wire.

Figure 9B:
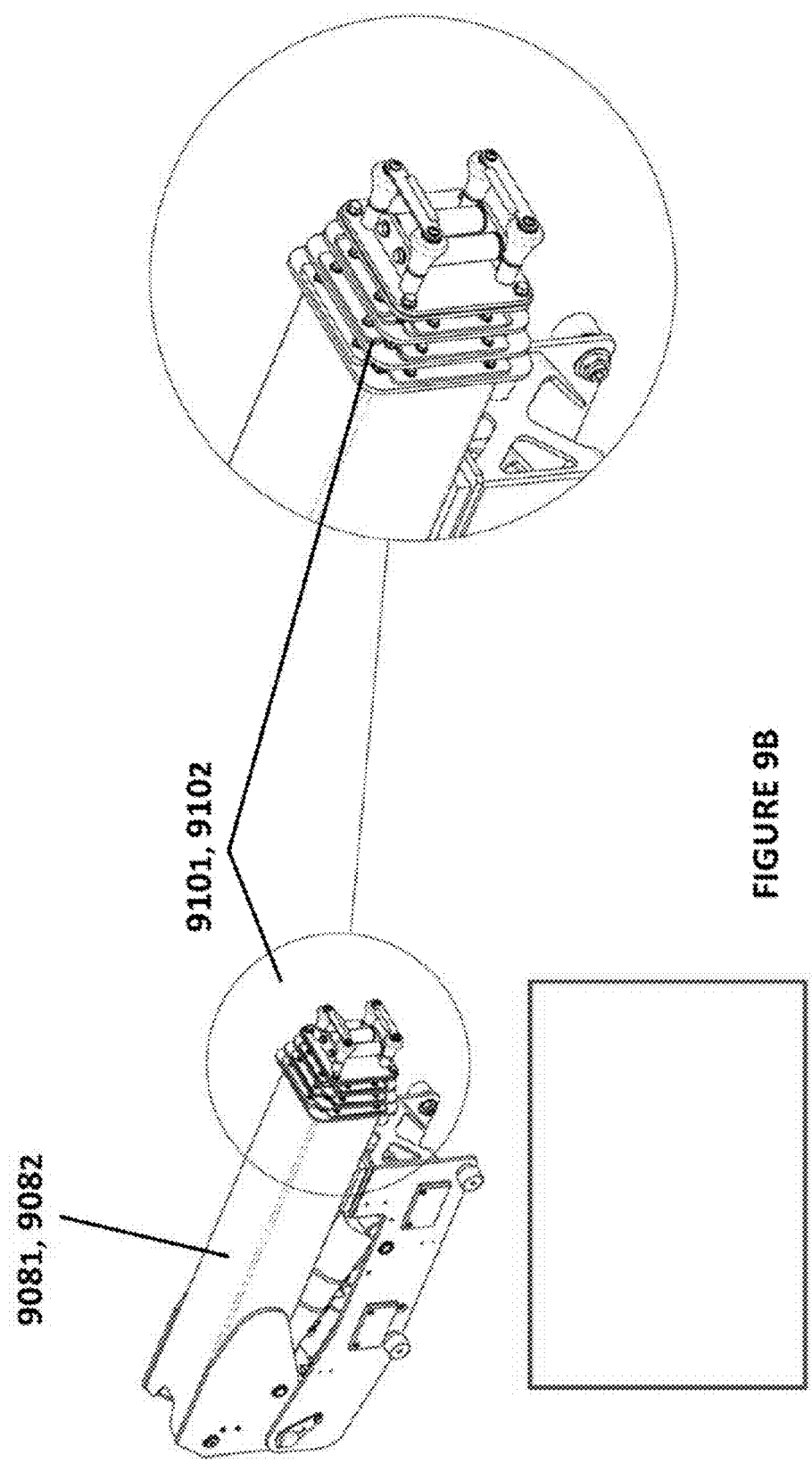
Figure 9C:
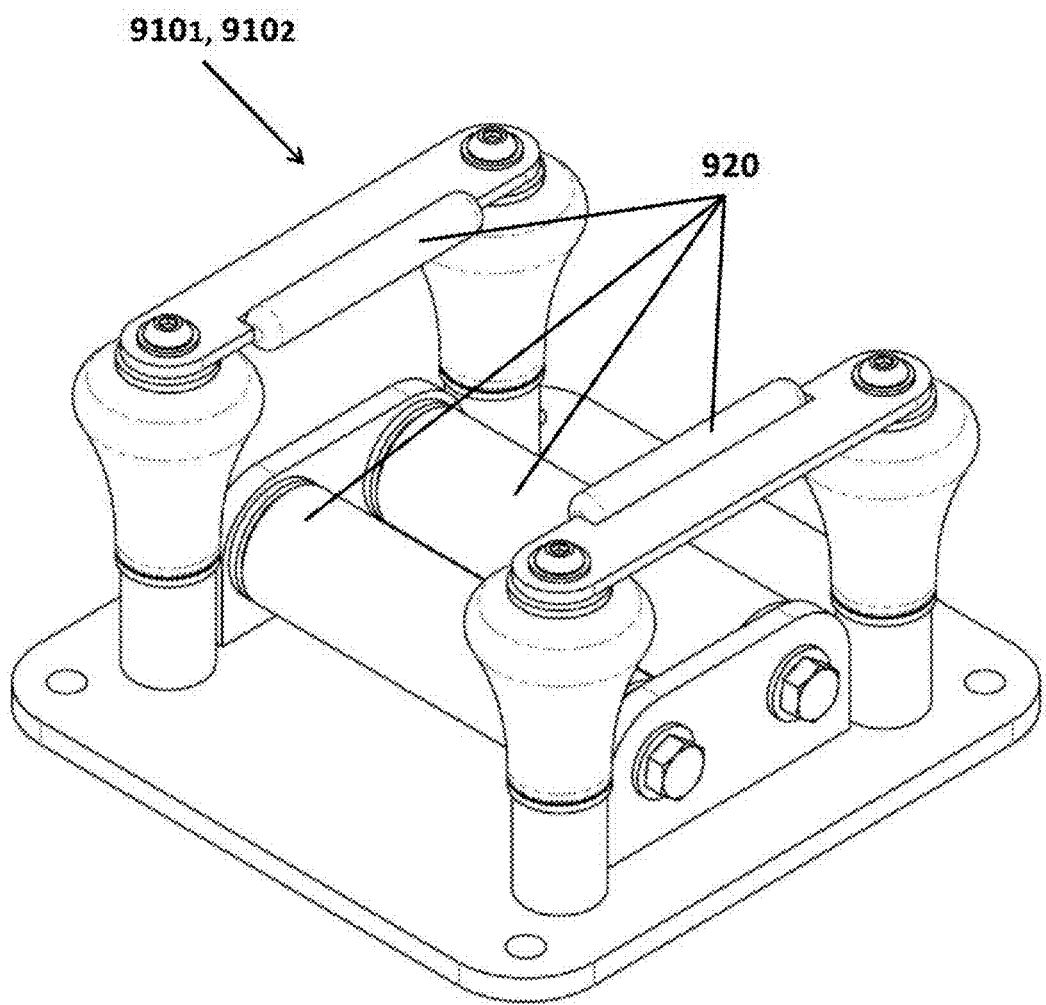

FIGS. 9B and 9C illustrates further details of each wire trapping mechanism $910_1$, $910_2$. Each wire trapping mechanism may trap a wire (either the messenger wire or the contact wire) so that the wire may be lifted and/or moved to the side so that the height or stagger may be adjusted or the cantilever arm or post may be replaced. As shown in FIG. 9C, each wire trapping mechanism may have one or more rollers 920 that prevent damage to the wire as the wire is being moved or lifted since wire may move across some of the rollers.

In one implementation, the wire manipulator 208 may be mounted over the cab of the truck so that the user in the bucket can control them from the bucket and use them to hold the wires during the installation process. For example, in catenary wire installation, the wire manipulator 208 may be used to hold and move the messenger wire 103 and contact wire 105 above the tracks 101. Since the truck has two independently controllable wire manipulator arms, the truck may be used by an operator in the bucket to hold both the messenger wire 103 and contact wire 105 at the same time (as shown in FIG. 14) while adjusting; repairing or replacing the cantilever arms 106 that are attached to the support post 102. Using a typical truck, this operation would require at least two trucks and 3 to 4 operators to do the work.

Figure 10:
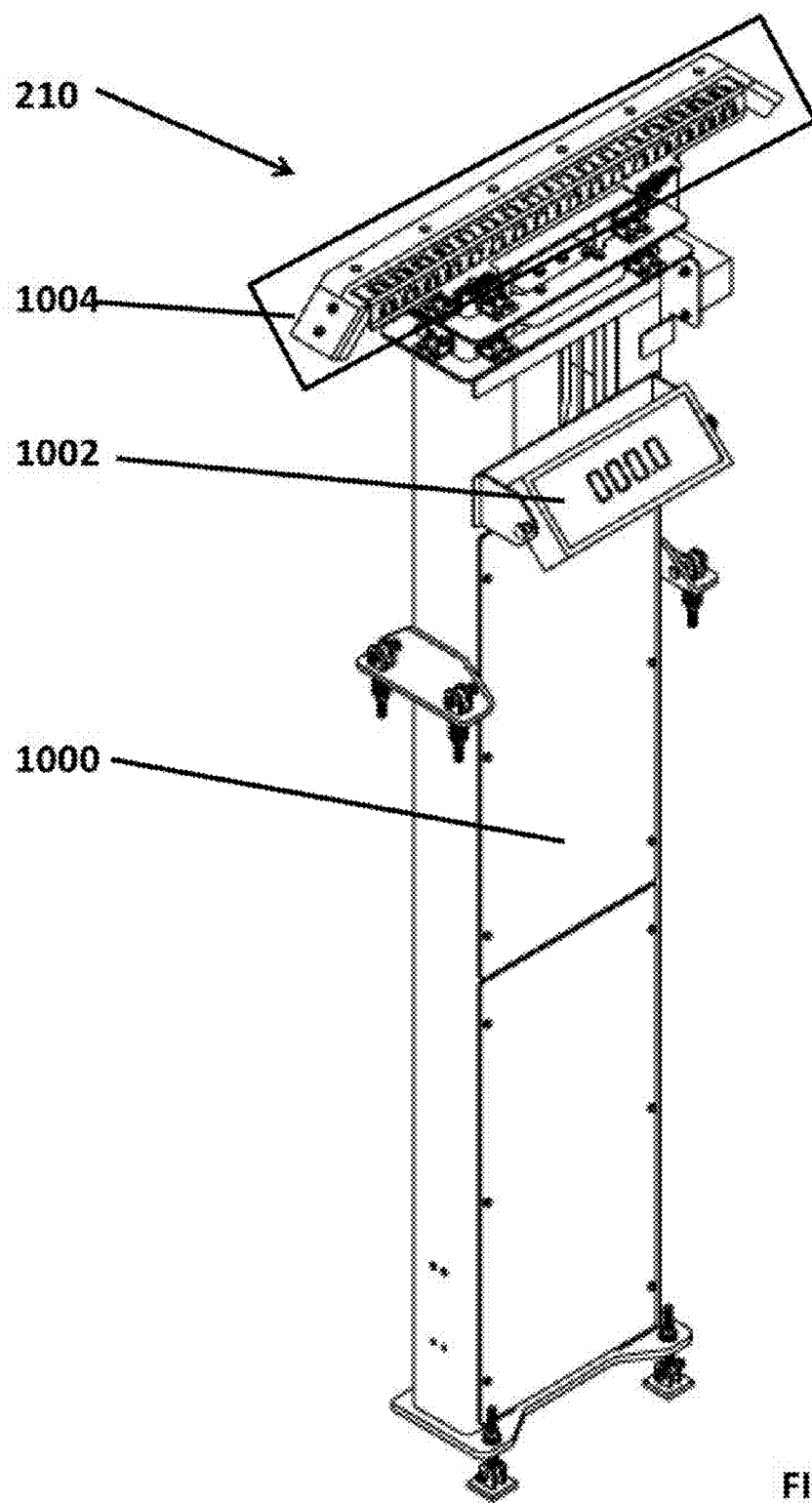
FIGS. 10 and 11 illustrate a measuring device of the contact wire that is part of the catenary wire installation truck.
Figure 11:
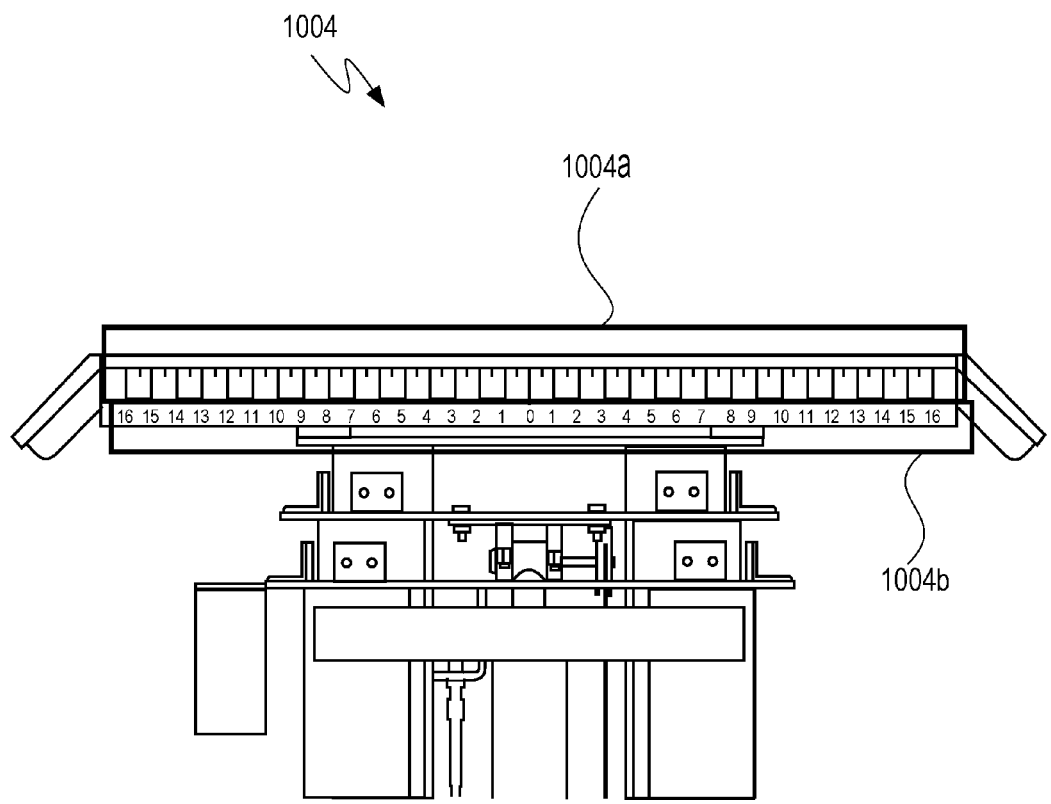

FIGS. 10 and 11 illustrate the measuring device 210 of the contact wire that is part of the catenary wire installation truck. As described above, the measuring device 210 that sits behind the cab portion of the truck and extends up to the contact wire 105 so that the measuring device may be used to measure the height of the contact wire from the top of rail and the stager of the wire from centerline of track. The position of the wire is part of the design of the system and the measuring device allows us to verify the position of the wire (since the measuring device may be height adjustable) and adjust the wire as needed to the different heights and staggers as described above. As shown in FIG. 10, the wire measuring device 210 may have support portion 1000 that is height adjustable so that the overall height of the measuring device may be adjusted depending on the desired height of the contact wire for the particular project. The wire measuring device 210 also may have a display 1000 and a stagger measuring element 1004 wherein the display 1002 may display information about the height of the contact wire and the stagger measuring element 1004 visually shows the stagger of the contact wire from the center of the set of tracks (e.g., the distance of the contact wire away from the center of the set of tracks.) As shown in FIG. 11, the stagger measuring element 1004, in one implementation, may have an alternating color pattern portion 1004a and a number portion 1004b underneath the alternating color pattern portion 1004a that allow the operate to visually see the stagger of the contact wire relative to the center of the set of tracks (e.g., the location of the contact wire away from a center of the set of tracks) and ensure that the contact wire, for the particular project, has the appropriate stagger.

FIG. 12 illustrates a remote control device 1200 for moving the catenary wire installation truck along the set of tracks. The remote control device 1200, that may be detachably mounted to the bucket so that a person in the bucket can control various function of the truck, may be used to independently control the creep drive, the wire manipulators 208 and the wire measuring device 210. For example, the control device 1200 may have a layout (when used with the implementation that has two wire manipulator arms) with a first wire manipulator control portion 1202 that has the control elements to control the first wire manipulator, a second wire manipulator control portion 1204 that has the control elements to control the second wire manipulator independent of the first wire manipulator, a creed drive portion 1206 with control elements for controlling the creep drive system and a bucket control portion 1208 for controlling the aerial and the bucket positioning. The control device 1200 also may have controls elements to control the wire measuring device. The control device 1200 may be connected to the various systems of the truck wirelessly or via a cable.

Figure 13:
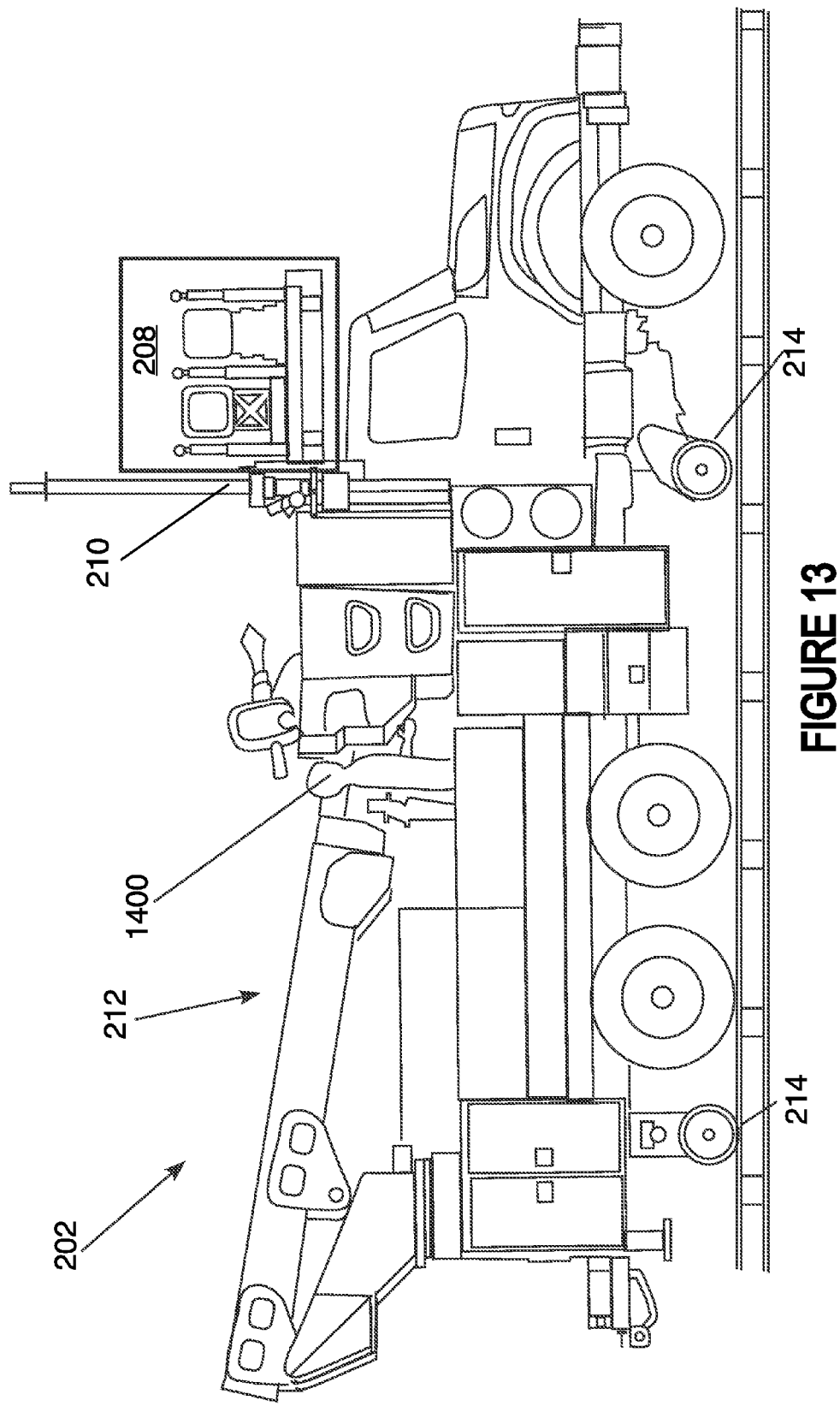
FIG. 13 illustrates the catenary wire installation truck resting of the rail gears so that the catenary wire installation truck can be moved along the set of tracks.

FIG. 13 illustrates the truck 202 with the rail gears 214 engaged on the set of tracks with an operator 1400 in the rear portion of the truck moving the truck using the creep drive device. In FIG. 14, the wire measuring device 210 have been extended upwards to measure the height and stagger of the contact wire, but the wire manipulators 208 are in the retracted position.

FIGS. 14-17 illustrate a method for installing catenary wire using a catenary wire installation truck. As shown in FIGS. 14 17, the operator 1400 is in the bucket and has moved the bucket so that the operator can adjust/fix the cantilever arms 106 attached to the support post 102. During this operation, the messaging wire 103 may be gripped and held by the first wire manipulator arm $908_1$ (because the operator controlled the first wire manipulator arm $908_1$ to extend it into the position to grip that wire) and the contact wire 105 may be gripped and held by the second wire manipulator arm $908_2$ (because the operator controlled the second wire manipulator arm $908_2$ to extend it into the position to grip that wire.) Thus, a single operator is able to move the truck (using the creep drive system), hold both of the wires and install or adjust or repair the support pole 102 or cantilever arms 106 or the insulators connected to the cantilever arms using the truck 202.

While the foregoing has been with reference to a particular embodiment of the invention, it will be appreciated by those skilled in the art that changes in this embodiment may be made without departing from the principles and spirit of the disclosure, the scope of which is defined by the appended claims.

The invention claimed is:

1. A wiring apparatus for an electric transportation system that uses a set of tracks with a messenger wire and a contact wire suspended above the set of tracks, comprising:
    a truck body;
    a wire manipulator coupled to the truck body, the wire manipulator having a first wire manipulator arm and a second wire manipulator arm that are each directly connected to the truck body and independently controlled, the first and second wire manipulator arms being used to separately hold an already installed messenger wire and an already installed contact wire of the electric transportation system; and
    a wire measuring device coupled to the truck body, the wire measuring device measuring a height of the contact wire above the set of tracks and a stagger of the contact wire relative to a center of the set of tracks, the wire measuring device further comprising a support portion that is height adjustable and a stagger measuring element at an upper end of the support portion that visually indicates the stagger of the contact wire.

2. The apparatus of claim 1, wherein the truck body has a cab portion and wherein the wire manipulator is located above the cab portion of the truck.

3. The apparatus of claim 2, wherein the wire measuring device is located behind the cab portion.

4. The apparatus of claim 1 further comprising an aerial device that hoists an operator towards the messenger wire and the contact wire, wherein the aerial device is located at a back portion of the truck body.

5. The apparatus of claim 4, wherein the aerial device further comprises a counterweight that stabilizes the aerial device.

6. The apparatus of claim 1 further comprising a creep drive device coupled to the truck body that allows the truck to be remotely moved.

7. The apparatus of claim 6, wherein the creep drive device further comprises a creep drive motor.

8. The apparatus of claim 1 further comprising two rail gear devices that allow the truck body to move along the set of tracks when the two rail gear device are engaged with the set of tracks.

9. The apparatus of claim 8, wherein the two rail gear devices are coupled to the truck body adjacent to a front set of wheels and a back set of wheels of the truck body.

10. The apparatus of claim 8 further comprising a pair of front wheels and a pair of rear wheels coupled to the truck body, wherein the truck body moves using the pair of front wheels and a pair of rear wheels when the rail gear devices are not engaged with the set of tracks.

11. The apparatus of claim 1 further comprising a control unit coupled to the wire manipulator and the wire measuring device that allows an operate to control each of the wire manipulator and the wire measuring device using the control unit.

12. The apparatus of claim 1, wherein each wire manipulator arm has a wire trapping mechanism at an end of the wire manipulator that traps a wire so that the wire is one of liftable or moveable without damaging the wire.

13. The apparatus of claim 12, wherein the wire trapping mechanism further comprises one or more rollers over which the wire moves when the wire is being one of lifted or moved using the wire manipulator arm.

14. The apparatus of claim 13, wherein the one or more rollers further comprises a first pair of horizontal rollers and a second pair of horizontal rollers having an axis of rotation that is perpendicular to an axis of rotation of the first pair of horizontal rollers.

15. The apparatus of claim 1, wherein the stagger measuring element of the wire measuring device further comprises an alternating color pattern portion and a number portion underneath the alternating color pattern portion to allow an operator to visually see the stagger of the contact wire.

\* \* \* \* \*